McW. F. MARGACH.

BALANCED VALVE.

No. 9,972. Reissued Dec. 13, 1881.

WITNESSES

Chas. Engel

W. E. Donnelly

INVENTOR

Mc William F. Margach

By Leggett & Leggett

ATTORNEYS

N. PETERS, Photo-Lithographer, Washington, D. C.

UNITED STATES PATENT OFFICE.

McWILLIAM F. MARGACH, OF MEADVILLE, PENNSYLVANIA.

BALANCED VALVE.

SPECIFICATION forming part of Reissued Letters Patent No. 9,972, dated December 13, 1881.

Original No. 218,040, dated July 29, 1879. Application for reissue filed October 15, 1881.

*To all whom it may concern:*

Be it known that I, McWILLIAM F. MARGACH, of Meadville, in the county of Crawford and State of Pennsylvania, have invented a new and Improved Balanced Valve, of which the following is a specification.

This invention relates to improvements in balancing the slide-valves of steam-engines by the pressure of a plate affixed to the upper side of the valve against the top plate of the steam-chest. Heretofore this has been accomplished by forcing the balancing-plate against the top of the steam-chest by means of springs; but this method is objectionable on two accounts: first, the pressure exerted by the springs is continuous, and the balance-plate is kept in contact with the top of the steam-chest at all times, and thus when running without steam there is unnecessary friction above and below; secondly, when running downgrade with the steam shut off a valve constructed in this manner creates a vacuum in the cylinder, the same as an ordinary slide-valve, with the result of drawing cinders, ashes, &c., through the exhaust into the cylinder and causing a rapid cutting and wearing thereof.

The object of my invention is to adapt the balancing device to be relieved from contact with the top of the steam-chest as soon as the steam is shut off, and to prevent the formation of a vacuum in the cylinder.

It consists, first, of a disk placed on top of the slide-valve, and encircling this disk with a ring, which, by the pressure of the steam underneath it, is forced up against the under side of the top of the steam-chest, so as to shut off from the pressure of the steam the area on the upper side of the valve inclosed by it, but which is adapted to fall back from contact with the top as soon as the steam is shut off.

It consists, secondly, in providing a hole in the top of the valve, at the center of the disk, leading through to the exhaust-opening, through which, when the steam is shut off, the steam and air in the cylinder are given way from end to end of the cylinder and the formation of a vacuum prevented.

Figure 1:
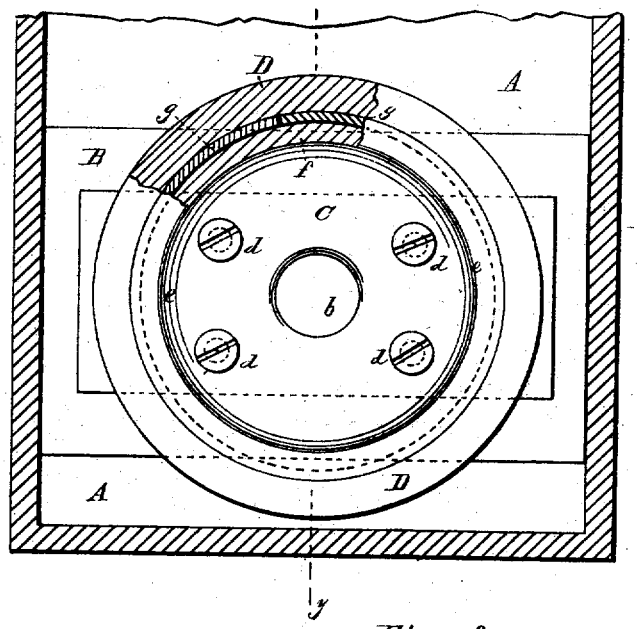
Figure 2:
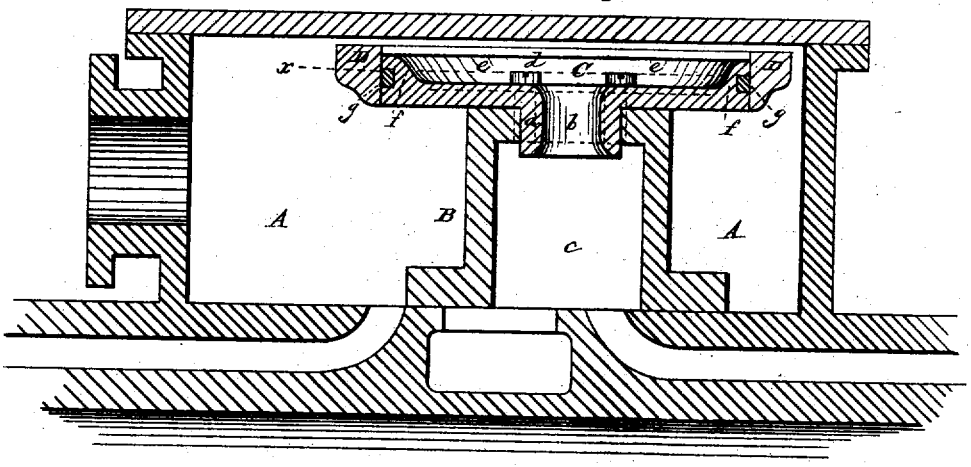

In the accompanying drawings, Figure 1 is a top plan or view of a valve provided with my improvement, with a part of the balancing device in section on line *x x* of Fig. 2; and Fig. 2 is a longitudinal section of the same on line *y y* of Fig. 1.

Similar letters of reference indicate corresponding parts.

Referring to the drawings, A is the steam-chest, and B is the slide-valve.

C is a disk with a central neck, *a*, having a hole, *b*, through it. The said neck is passed through a hole in the top of the valve midway of its length, giving thus a free passage-way between the exhaust-opening *c* in the valve and the steam-chest. The neck *a* also serves as a dowel for holding the disk on the valve, further security being given by the screws *d d d d*, passed down through the disk into the valve. The disk is provided with a crown-flange, *e*, and in its periphery is a groove, *f*, in which is placed spring steam-packing *g*.

D is the ring for closing the passage-way between the exhaust-opening and the steam-chest, and which I call the "floating ring." It is placed over the periphery of the disk, and a steam-tight joint is formed between it and the periphery of the disk by the expansion of the spring-packing *g*. The under edge of ring D is beveled from the outer periphery downward and inward, so as to leave but a narrow bearing-edge for resting on the top of the valve, and thus furnish a better surface for the action of the steam. When no steam is entering the steam-chest the floating ring rests on top of the valve, so that a space of from one-sixteenth to one-quarter of an inch is left between it and the top plate of the steam-chest; but when the engine is running under steam the pressure of the steam on the under side of the ring forces it up in contact with the top plate of the steam-chest, and thus the steam is shut off from the surface of the disk, and to the extent of its area the valve is entirely relieved from the pressure of the steam downward on its seat, whereby a practical balancing of the valve is obtained. When steam is shut off in running downgrade and into stations, the ring falls back on the valve and thus friction between it and the top plate of the steam-chest is avoided, and there is no downward pressure on the valve-seat.

Another advantage obtained by this construction is that when the engine is running downgrade without steam a vacuum is prevented from forming in the cylinder, as the passage-way through the valve and over the disk to the steam-ports permits the steam and air remaining in the cylinder at every stroke of the piston to pass from end to end back and forth, preventing a vacuum at either end, and thereby preventing the drawing of ashes, cinders, dust, &c., from the smoke-box into the cylinder.

Having thus described my invention, I claim as new and desire to secure by Letters Patent—

1. In a balance-valve, a disk and a ring encircling the disk, and so constructed that the pressure of the steam underneath it will force it against the under side of the top of the steam-chest, and will fall back from contact with the top when the pressure is removed, substantially as set forth.

2. In a balance-valve, the combination, with a disk attached to the top of a slide-valve, as described, of a ring encircling said disk, and so constructed that the pressure of the steam underneath it will force the ring against the under side of the top of the steam-chest, and will permit it to fall back from contact with the top when the pressure is removed, substantially as set forth.

3. In a balance-valve, a disk attached to the top of a slide-valve, said disk and valve provided with exhaust-opening, whereby a passage for the steam and air is provided when the steam is shut off through the valve from one end of the cylinder to the other, substantially as and for the purposes shown.

4. In a balance-valve, a ring encircling the disk of the valve, and so constructed that the pressure of the steam underneath it will force it against the under side of the top of the steam-chest and will fall back from contact with the top when the pressure is removed, and provided with an exhaust-opening, by means of which a pressure upon the valve may be removed, substantially as and for the purposes shown.

5. In a balance-valve, the combination of a disk attached to the top of a slide-valve, with a ring encircling the said disk, and so constructed that the pressure of the steam underneath it will force it against the under side of the top of the steam-chest, and will fall back from contact with the top when the pressure is removed, said disk and ring being each porvided with an exhaust-opening, by means of which a pressure upon the valve may be removed, substantially as and for the purposes shown.

6. As an improvement in balanced valves for steam-engines, the disk C, with hollow neck *a*, fitted into the exhaust-opening in the valve, and provided with steam-packing *g* in its periphery, in combination with an encircling-ring adapted to rest on the valve when the engine is running downgrade without steam, but when under steam-pressure it is forced up against the top plate of the steam-chest, and thus shuts off the area of the disk from the pressure of the steam and relieves the pressure on the valve, substantially as described.

7. In combination with a balance-valve provided with a circular top or disk, the latter encircled by a ring and provided with steam-packing and also with an exhaust-opening for the passage of air or steam, the ring, whereby the pressure of steam forces the ring against the steam-chest cover, thus shutting off the pressure from the area of the circle inclosed by the ring, substantially as and for the purposes shown.

8. In a balance-valve having a circular top or disk provided with an encircling-ring adapted to revolve freely about the top, and a groove adapted to receive steam-packing, whereby the steam is prevented from passing between the circular valve-top and encircling-ring, said circular valve-top being further provided with an opening sufficiently large to permit the passage of the volume of exhaust by way of the chest-cover at will, substantially as and for the purposes shown.

9. In a balance-valve, a disk attached to the slide-valve by means of a central hollow neck passing through the disk, and by screws or equivalent means, substantially as set forth.

In testimony whereof I affix my signature in the presence of two subscribing witnesses.

McWILLIAM FRED. MARGACH.

In presence of—

MILTON H. McNAIR,

L. J. ROBERTS.